United States Patent
Ledford (10) Patent No.: US 11,958,205 B2
(45) Date of Patent: Apr. 16, 2024

(54) SCORE DIE, SCORE DIE FORMING SYSTEM, AND ASSOCIATED METHOD

(71) Applicant: Stolle Machinery Company, LLC, Centennial, CO (US)

(72) Inventor: Jonathon D. Ledford, New Carlisle, OH (US)

(73) Assignee: STOLLE MACHINERY COMPANY, LLC, Centennial, CO (US)

( * ) Notice: Subject to any disclaimer, the term of this patent is extended or adjusted under 35 U.S.C. 154(b) by 197 days.

(21) Appl. No.: 17/445,407

(22) Filed: Aug. 19, 2021

(65) Prior Publication Data
US 2021/0379788 A1 Dec. 9, 2021

Related U.S. Application Data

(63) Continuation of application No. 16/175,942, filed on Oct. 31, 2018, now abandoned.

(51) Int. Cl.
| | |
|---|---|
| *B26F 1/44* | (2006.01) |
| *B23P 15/24* | (2006.01) |
| *B26D 3/08* | (2006.01) |
| *B21D 37/20* | (2006.01) |
| *B21D 51/38* | (2006.01) |

(52) U.S. Cl.
CPC ............ *B26F 1/44* (2013.01); *B23P 15/24* (2013.01); *B26D 3/08* (2013.01); *B21D 37/20* (2013.01); *B21D 51/383* (2013.01)

(58) Field of Classification Search
CPC .. B26F 1/44; B23P 15/24; B23P 15/00; B21D 51/383; B21D 37/20; B26D 3/08
See application file for complete search history.

(56) References Cited

U.S. PATENT DOCUMENTS

| | | | | |
|---|---|---|---|---|
| 922,926 | A | * 5/1909 | Lynch | B26F 1/44 76/107.8 |
| 2,216,462 | A | * 10/1940 | Spang | B21K 5/02 72/340 |
| 2,361,288 | A | * 10/1944 | Hardy, Jr. | B26F 1/44 407/120 |
| 2,822,708 | A | * 2/1958 | Nelson | B21K 5/20 76/107.1 |
| 3,728,980 | A | 4/1973 | Fraze | |
| 4,277,988 | A | * 7/1981 | Crowe | B21D 37/20 29/558 |

(Continued)

FOREIGN PATENT DOCUMENTS

| | | | |
|---|---|---|---|
| CN | 101104276 A * | 1/2008 | ............... B26F 1/44 |
| CN | 104942879 A | 9/2015 | |

(Continued)

OTHER PUBLICATIONS

CN 101104276, Translation (Year: 2024).*
JP 2007136629, Translation (Year: 2024).*
JPH 11188698, Translation (Year: 2024).*
European Patent Office, EP19878373.0, Extended European Search Report, dated Oct. 24, 2022, 12 pages.

(Continued)

*Primary Examiner* — Nhat Chieu Q Do
(74) *Attorney, Agent, or Firm* — Eckert Seamans Cherin & Mellott, LLC (57) ABSTRACT

A score die including a body with a generally planar first surface. The first surface includes a score blade. The score blade has a number of cutting portions, and, each cutting portion has a substantially uniform cross-section.

11 Claims, 4 Drawing Sheets

(56) References Cited

U.S. PATENT DOCUMENTS

| | | | | |
|---|---|---|---|---|
| 4,625,592 A | * | 12/1986 | Bayens | B26F 1/00 |
| | | | | 76/107.8 |
| 5,219,257 A | | 6/1993 | Koch | |
| 6,305,260 B1 | * | 10/2001 | Truttmann | A61F 13/15723 |
| | | | | 83/52 |
| 9,757,792 B1 | * | 9/2017 | Doll | B21H 3/022 |
| 2005/0155478 A1 | * | 7/2005 | Zimmer | B26D 1/0006 |
| | | | | 83/695 |
| 2015/0266083 A1 | * | 9/2015 | LeVey | B21H 3/06 |
| | | | | 76/4 |
| 2015/0329238 A1 | | 11/2015 | Chasteen et al. | |
| 2016/0158827 A1 | * | 6/2016 | Chen | B21K 5/16 |
| | | | | 76/119 |

FOREIGN PATENT DOCUMENTS

| | | | | |
|---|---|---|---|---|
| JP | H 11188698 | * | 7/1999 | |
| JP | 2007136629 A | * | 6/2007 | |
| WO | WO-9933621 A1 | * | 7/1999 | B26D 1/0006 |

OTHER PUBLICATIONS

European Patent Office, EP Application No. 19878373.0, Supplementary Partial European Search Report, dated Jul. 6, 2022, 14 pages.

China National Intellectual Property Administration, CN Application No. 201980070992.6 Office Action, Dec. 1, 2022, 10 pages, and English translation.

* cited by examiner

SCORE DIE, SCORE DIE FORMING SYSTEM, AND ASSOCIATED METHOD

CROSS REFERENCE TO RELATED APPLICATIONS

This application is a continuation application of and claims priority to U.S. patent application Ser. No. 16/175,942, filed Oct. 31, 2018 entitled, SCORE DIE, SCORE DIE FORMING SYSTEM, AND ASSOCIATED METHOD.

FIELD OF THE INVENTION

The disclosed and claimed concept relates to a die structured to form a score on a can end, a system for making the die and the method of making the die.

BACKGROUND OF THE INVENTION

Metal container closures, or can ends, are constructs structured to close a substantially enclosed space defined by a container body. In one embodiment, the container is a beverage container that includes a beverage can body and a beverage can container closure (or beverage can end). That is, the container body is a beverage can body, such as but not limited to, a can body for carbonated beverages, hereinafter, and as used herein, a "beverage" can body. The beverage can body includes a bottom, or base, with an upwardly depending sidewall. The base and sidewall define a substantially enclosed space. After the beverage can body is filled with a liquid, a beverage can end, which is a container closure, is coupled to the beverage can body. The can end includes a container opening. That is, the can end includes an end panel and a tear panel. The end panel comprises the bulk of the can end and is generally planar. The tear panel defines the container opening. That is, the tear panel is a small portion of the end panel defined by a score line. The score line weakens the material of the end panel. As is known, a lift tab is coupled to the end panel adjacent the tear panel. When the lift tab is actuated, i.e., lifted, a portion of the lift tab engages the tear panel and causes the tear panel to move relative to the end panel. As the tear panel moves relative to the end panel, the tear panel and the end panel separate at the score line. As is known, the score line does not extend entirely about the tear panel. In this configuration, there is a connection tab, or hinge, that links the tear panel to the end panel. Thus, the tear panel does not fall into the beverage can body, but rather flexes toward the beverage can body so that a consumer may drink the liquid via the container opening. The score line, in an exemplary embodiment, includes two portions; a primary score and an anti-fracture score. The primary score and the anti-fracture score extend generally parallel to each other and are contiguous. That is, the two score lines are generally parallel to each other and include a curved transition portion extending between the generally parallel primary score and the anti-fracture score.

The can closure is formed in a forming assembly including a number of dies. As is known, the forming assembly converts a generally circular, generally planar blank into a can closure and includes dies structured to create an annular countersink, a rivet, and the score lines (i.e., the primary score and the anti-fracture score) that define the tear panel. In an exemplary embodiment, the score lines are formed by a single "score" die acting on the can closure blank. As used herein, a "score" die is the die that forms the score on the can closure blank.

For a beverage can closure, as well as others, the score die includes a body that is generally cylindrical and which is generally short, i.e., the height of the body is less than the diameter. That is, the score die body is a disk or "puck" like. The score die body includes two opposed, generally planar end surfaces and a number of openings. The openings include mounting couplings and a tear panel opening shaped to generally correspond to the shape of the resulting tear panel. On the "top" surface of the score die body is a "score blade." As used herein, the "top" surface of a die is the surface that performs forming operations on a blank. As used herein, a "score blade" is a ridge or other construct extending from the top surface of a die. In an exemplary embodiment, the score blade includes two cutting portions; a primary score blade portion and an anti-fracture score blade portion. The primary score blade portion and the anti-fracture score blade portion are, in an exemplary embodiment, contiguous and extend about the tear panel opening in a generally parallel configuration.

The primary score blade portion and the anti-fracture score blade portion are difficult to create, are generally not uniform, and wear out quickly. These are all problems. That is, creation of a score die occurs, generally, as follows. A die blank is machined so as to include a generally finished score blade and generally finished openings. As used herein, "machined" (or to "machine"/"machining") means to form and/or substantially change the shape, contour, and/or cross-section of an element/construct on the die using a machine. Actions such as grinding to remove scale and polishing to create a smooth surface are not "machining" actions. That is, actions to remove scale or surface imperfections but which are not intended to, and do not substantially, change the shape, contour, and/or cross-section of a construct on the die, are not "machining" actions. Conversely, grinding and polishing that are intended to, and do, change the shape of an element/construct such as, but not limited to a score blade, are "machining" actions.

Stated alternately, the score blade and the openings are "soft finished." As used herein, "soft finished" elements/constructs related to a die are elements/constructs that are generally finished, but which are not heat treated. As used herein, an element/construct on a die that is "generally finished" means that a die element/construct such as, but not limited to a score blade, has the general shape, contour, and/or cross-section of the finished element/construct but that more machining/forming actions are required. That is, the shape, contour, and/or cross-section of the element/construct is identifiable but the element/construct will be further altered due to machining, grinding and polishing. It is noted that actions such as grinding and polishing do not always alter the shape, contour, and/or cross-section of an element/construct on a die. The nature of the grinding and polishing determines whether the action is a machining/forming action on the element/construct.

The die blank is then heat treated thereby converting the "soft finished" elements/constructs to be "hard finished" elements/constructs. As used herein, a "hard finished" element/construct means an element/construct that has been heat treated and is generally finished. Following heat treatment, the score blade is then ground to remove the heat treatment scale. As is known, heat treatment scale is a thin coating of oxide forming on the surface of a metal. This grinding to remove scale is not intended to, and does not, change the shape of the element/construct on the die blank.

The score blade is then hand polished to create a "substantially finished" score blade. That is, the hand polishing changes the shape, contour, and/or cross-section of the score blade. "Hand polishing" is not type of "machining," however, in that the work is done by hand and not by machine. Moreover, this is a problem because hand polishing is not a repeatable action. As used herein, a "repeatable action" is an action, or series of actions, that is repeatedly performed in a substantially similar manner and which produces a substantially similar result. While the motions of "hand polishing" may, or may not, be similar, hand polishing produces different results. For example, a score blade and the anti-fracture blade have a width of about 0.001-0.0015 inch and 0.0015-0.002 inch, respectively. Following hand polishing, the surfaces of the score blade will be within tolerances, but, at different locations along the length of the score blade, the shape, contour, and/or cross-section of the score blade will be different from other locations. Moreover, different score blades, i.e., score blades on different score dies, will be different from each other. That is, the variations along the length of the score blades will be different on each score die. Thus, as used herein, a score blade that is hand polished are not substantially uniform. This is a problem.

Following hand polishing, the score blade is "substantially finished." As used herein, "substantially finished" means that a die element/construct such as, but not limited to a score blade, substantially has the shape, contour, and/or cross-section of the finished element/construct but that actions that do not alter the shape, contour, and/or cross-section of the element/construct are, in an exemplary embodiment, still performed. As used herein, actions that are performed on a "substantially finished" element/construct on a die include grinding and polishing that do not alter the shape, contour, and/or cross-section of the element/construct on a die. For example, as used herein, "light polishing" means polishing to remove scratches and other minor imperfections and which does not alter the shape, contour, and/or cross-section of the element/construct. Light polishing of the score blade does not alter the shape, contour, and/or cross-section of a "substantially finished" score blade. Further, as used herein, applying a coating does not alter the shape, contour, and/or cross-section of the element/construct on a die.

Once the score blade is "substantially finished" the die blank is inspected and, if the die blank and the elements/construct thereon are within tolerances, the score blade is coated with titanium nitride (TiN) and aluminum nitride (AlTiN). Given the non-uniform nature of hand polished surfaces, known coatings are applied with a thickness of greater than 0.00008 inch. A coating thinner than this is prone to degrade. That is, the non-uniform shape contour, and/or cross-section of the score blade causes imperfections in the application, and resulting shape of, the coating. These imperfections cause the coating to flake off or otherwise become decoupled from the score blade. This, in turn, results in the faster degradation due to wear and tear on the score blade. This is also a problem. That is, coatings with a thickness of 0.00008 inch do not adhere to a score blade for an extended period of time. This is a problem.

There is a need for a score die that overcomes the problems identified above. There is a further need for a system to make such a score die and a method of making such a score die.

SUMMARY OF THE INVENTION

These needs, and others, are met by at least one embodiment of the disclosed and claimed concept which provides a score die including a body with a generally planar first surface. The first surface includes a score blade, wherein the score blade has a number of cutting portions, and, wherein each cutting portion has a substantially uniform cross-section.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function or use. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "path of travel" or "path," when used in association with an element that moves, includes the space an element moves through when in motion. As such, any element that moves inherently has a "path of travel" or "path." Further, a "path of travel" or "path" relates to a motion of one identifiable construct as a whole relative to another object. For example, assuming a perfectly smooth road, a rotating wheel (an identifiable construct) on an automobile generally does not move relative to the body (another object) of the automobile. That is, the wheel, as a whole, does not change its position relative to, for example, the adjacent fender. Thus, a rotating wheel does not have a "path of travel" or "path" relative to the body of the automobile. Conversely, the air inlet valve on that wheel (an identifiable construct) does have a "path of travel" or "path" relative to the body of the automobile. That is, while the wheel rotates and is in motion, the air inlet valve, as a whole, moves relative to the body of the automobile.

As used herein, the statement that two or more parts or components "engage" one another means that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "temporarily coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality). That is, for example, the phrase "a number of elements" means one element or a plurality of elements.

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can.

As used herein, a "product side" means the side of a construct used in a container that contacts, or could contact, a product such as, but not limited to, a food or beverage. That is, the "product side" of the construct is the side of the construct that, eventually, defines the interior of a container.

As used herein, a "customer side" means the side of a construct used in a container that does not contact, or could not contact, a product such as, but not limited to, a food or beverage. That is, the "customer side" of the construct is the side of the construct that, eventually, defines the exterior of a container.

As used herein, "generally curvilinear" includes elements having multiple curved portions, combinations of curved portions and planar portions, and a plurality of planar portions or segments disposed at angles relative to each other thereby forming a curve.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and/or near relevant to the term being modified as would be understood by one of ordinary skill in the art.

Figure 1:
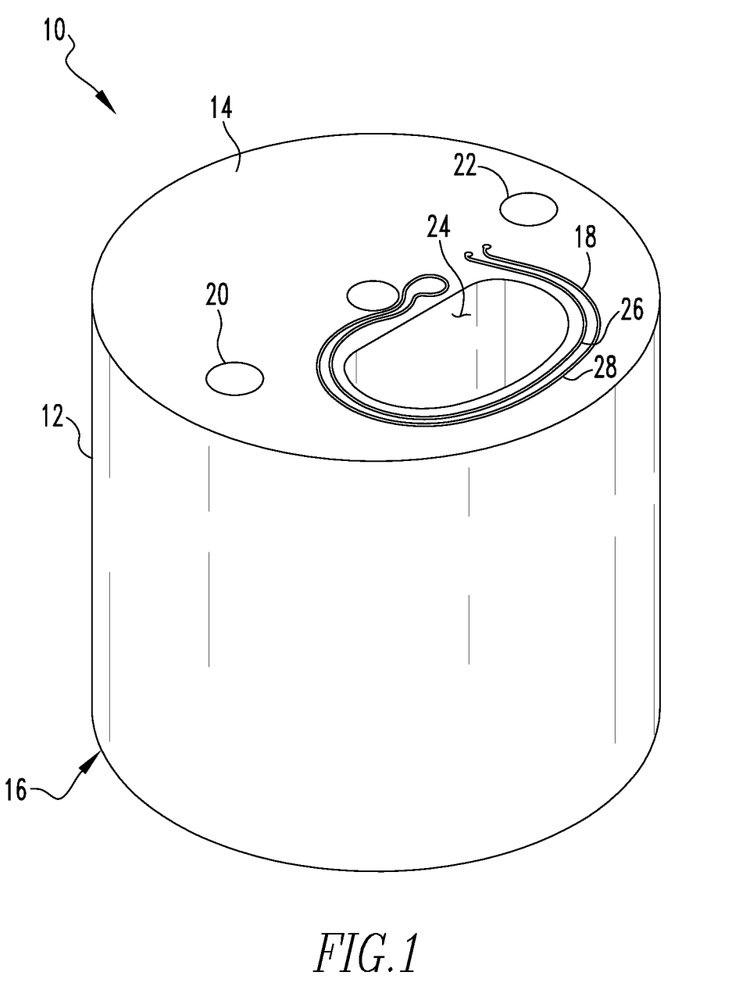
FIG. 1 is an isometric view of a score die.

FIG. 1 shows a score die 10 including a body 12. The score die body 12, in an exemplary embodiment, is generally cylindrical and includes a generally planar axial first surface 14 and an opposing generally planar axial second surface 16. The die body first surface 14 includes a score blade 18. The score blade 18 extends from the plane of the die body first surface 14. The score die body 12 further includes a number of openings such as, but not limited to, two dowel (or mounting) openings 20, 22 and a tear panel opening 24. As is well known, the dowel (or mounting) openings 20, 22 are used to mount the score die body 12 in a press and/or on forming assemblies when the score die body 12 is being made. As is known, the tear panel opening 24 corresponds to the location and shape of a tear panel on a can end. The score blade 18 extends substantially about the tear panel opening 24.

Figure 1A:
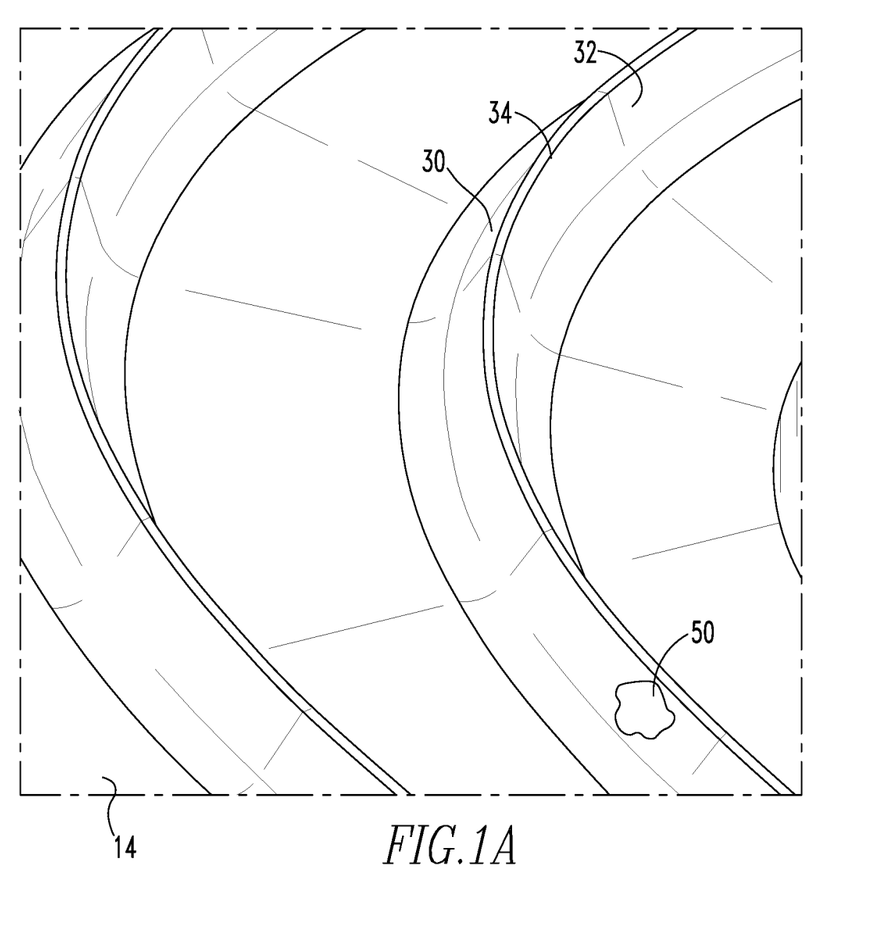
FIG. 1A is detail view of a score blade on a score die.

In an exemplary embodiment, and as shown in FIG. 1A, the score blade 18 includes two substantially planar surfaces (when viewed in cross-section and/or at any specific location). In this exemplary embodiment, the score blade 18 when viewed in cross-section has a shape that is, essentially, an inverted "V." It is understood that this shape is exemplary and that a score blade, in other embodiments, has other cross-sectional shapes that include more than two surfaces. The following description uses the inverted "V" shape score blade 18 as an example, but it is understood that the description of the score die 10, as well as the system and method discussed below, are applicable to score blades with more than two surfaces.

In an exemplary embodiment, the score blade 18 has a number of cutting portions (two shown). That is, as used herein, a score blade "cutting portion" serves to create a specific type of score in a can end. In the exemplary embodiment shown, the score blade 18 includes a primary score, first cutting portion 26 (also identified commonly as the "score" blade) and an anti-fracture, second cutting portion 28 (also identified commonly as the "anti-fracture" blade). As used herein, the "score blade" 18 includes both cutting portions described herein.

Further, the score blade 18 has a "length." The score blade 18 is not generally straight along the entire length. For a beverage can, the score blade 18 extends substantially about the tear panel opening 24 that, as shown, is generally oval shaped. Thus, for a beverage can closure, the score blade 18 length extends substantially about an oval shape. More specifically, the first cutting portion 26 and the second cutting portion 28 extend generally parallel to each other and in a generally oval pattern. That is, the first cutting portion 26 and the second cutting portion 28 are not straight, but at any given location, the first cutting portion 26 and the second cutting portion 28 are generally parallel to each other. As is known, the first cutting portion 26 extends substantially about and immediately adjacent the tear panel opening 24. The score blade 18 also includes a "U" shaped portion wherein the first cutting portion 26 doubles back and becomes the second cutting portion 28. The "U" shaped portion is the transition between the first and second cutting portions, 26, 28. The second cutting portion 28 then extends about the first cutting portion 26 and the tear panel opening 24. As is known, on a can end, the score line does not extend entirely about the tear panel. In this configuration, there is a connection tab, or hinge, that links the tear panel to the end panel. Thus, as used herein, the score blade 18 extends "substantially about" the tear panel opening 24 meaning that the score blade 18 extends about the tear panel opening 24 other than the portion that defines the hinge discussed above.

As noted above, in the exemplary embodiment shown, both the first cutting portion 26 and the second cutting portion 28 each have an inverted "V" shape when viewed in cross-section. Thus, the score blade 18, i.e., each cutting portion 26, 28, includes an associated first surface 30 and second surface 32. When viewed in cross-section, these surfaces are generally, or substantially, planar. The score blade first surface 30 and the score blade second surface 32 meet at a flat vertex 34. That is, when viewed in cross-section, the score blade 18 appears as a triangle with a truncated top. As used herein, a "flat vertex" means the flat at the top of such a truncated triangle. The score blade 18, i.e., each portion 26, 28, has a "thickness" that is measured at the flat vertex 34 which is the cutting surface of the score blade 18. The "thickness" is measured between the score blade first surface 30 and the score blade second surface 32 and along a line that is generally perpendicular to a longitudinal line that follows the shape of the blade. That is, the "thickness" is measured as the shortest length across the flat vertex 34. Further, the score blade 18, i.e., each portion 26, 28, has a "height" that is measured between the flat vertex 34 and at the interface with the die body first surface 14. Further, the score blade 18, i.e., each portion 26, 28, "angle" is measured between the first surface 30 and the second surface 32. That is, the truncated portion of the "flat vertex" is ignored and the angle is identified as the blade "angle," the "vertex angle" and/or "angle of the vertex." As used herein, the score blade 18 "thickness," "height," and "(vertex) angle" are all measured as part of a cross-section. It is noted that, among other characteristics, the thickness, height and angle of a hand polished score blade are generally variable along the length of the score blade.

The disclosed and claimed score die 10, however, includes a score blade 18 wherein each cutting portion 26, 28 has a substantially uniform cross-section. As used herein, "substantially uniform cross-section" means that the thickness, height and/or angle of the cutting portion 26, 28 does not change substantially along the length of the score blade 18, or, along each cutting portion 26, 28. That is, as used herein, "does not change substantially" means that any of the characteristics of thickness (at the flat vertex), height and/or angle of either cutting portion 26, 28 does not change by more than 10% along the length of the cutting portion 26, 28.

Further, in an exemplary embodiment, the thickness (at the flat vertex) of the first cutting portion 26 does not vary more than 0.0002 along the length of the first cutting portion 26. Further, the angle of the first cutting portion 26 does not vary more than ¼ of a degree along the length of the first cutting portion 26. Further, in an exemplary embodiment, the height of first cutting portion 26 does not vary more than 0.0002 inch along the length of the first cutting portion 26. Similarly, the thickness (at the flat vertex) of the second cutting portion 28 does not vary more than 0.0002 along the length of the second cutting portion 28. Further, the angle of the second cutting portion 28 does not vary more than ¼ of a degree along the length of the second cutting portion 28. Further, in an exemplary embodiment, the height of second cutting portion 28 does not vary more than 0.0002 inch along the length of the second cutting portion 28.

That is, each cutting portion 26, 28 may have a cross-sectional shape that is different from the other cutting portion 26, 28. Moreover, when compared to another score die 10, the score blades 18 also have a "substantially similar uniform cross-section." As used herein, a "substantially similar uniform cross-section" means that score blades on different score dies 10 each have a "substantially uniform cross-section" and that the "substantially uniform cross-section(s)" are substantially similar to each other. A score die 10, or score die blank 101, with a substantially uniform cross-section solves the problem(s) noted above. Further, different score dies 10 with score blades 18 having "substantially similar uniform cross-section" also solves the problem(s) noted above.

Further, the score blade 18, i.e., each cutting portion 26, 28, has a "machine smoothed" surface. That is, the score blade first surface 30 and the score blade second surface 32 has a surface that is substantially formed by machining. That is, the characteristics of the score blade first surface 30 and the score blade second surface 32 are created during forming. Thus, as used herein, "machined smoothed" means that the surfaces 30, 32 of the score blade 18 are not created by a hand polishing process. As no specific machine or process is identified, however, "machined smoothed," as used herein, does not mean a product-by-process. One example of creating a "machined smoothed" is discussed below. In an exemplary embodiment, the score blade 18, i.e., each cutting portion 26, 28, machine smoothed score blade first and second surfaces 30, 32 has a smoothness of 8.0 RA (μm) or less. A score die 10, or score die blank 101, with a machined smoothed score blade 18 solves the problem(s) noted above.

Also as discussed below, the score blade 18, i.e., each cutting portion 26, 28, has coating 50 (shown schematically) applied thereto. As noted above, the thickness of the coating 50 is associated with how uniform the score blade first and second surfaces 30, 32 are. The substantially uniform cross-section score blade 18 with the machined smoothed score blade surfaces 30, 32, are structured to have a coating 50 adhere thereto for an extended period of time. That is, a thinner coating 50 adheres to a score blade 18 for an extended period of time and the substantially uniform cross-section score blade 18 with the machined smoothed score blade surfaces 30, 32 are structured to have a "thin" coating applied thereto. As used herein, a "thin" coating means a coating with a thickness of less than 0.00008 inch. Further, in an exemplary embodiment, the substantially uniform cross-section score blade 18 with the machined smoothed score blade surfaces 30, 32, are structured to have a "very thin" coating applied thereto. As used herein, a "very thin" coating means a coating with a thickness of less than 0.00004 inch. A score die 10 with a thin, or a very thin, coating 50 solves the problem(s) noted above.

Figure 2:
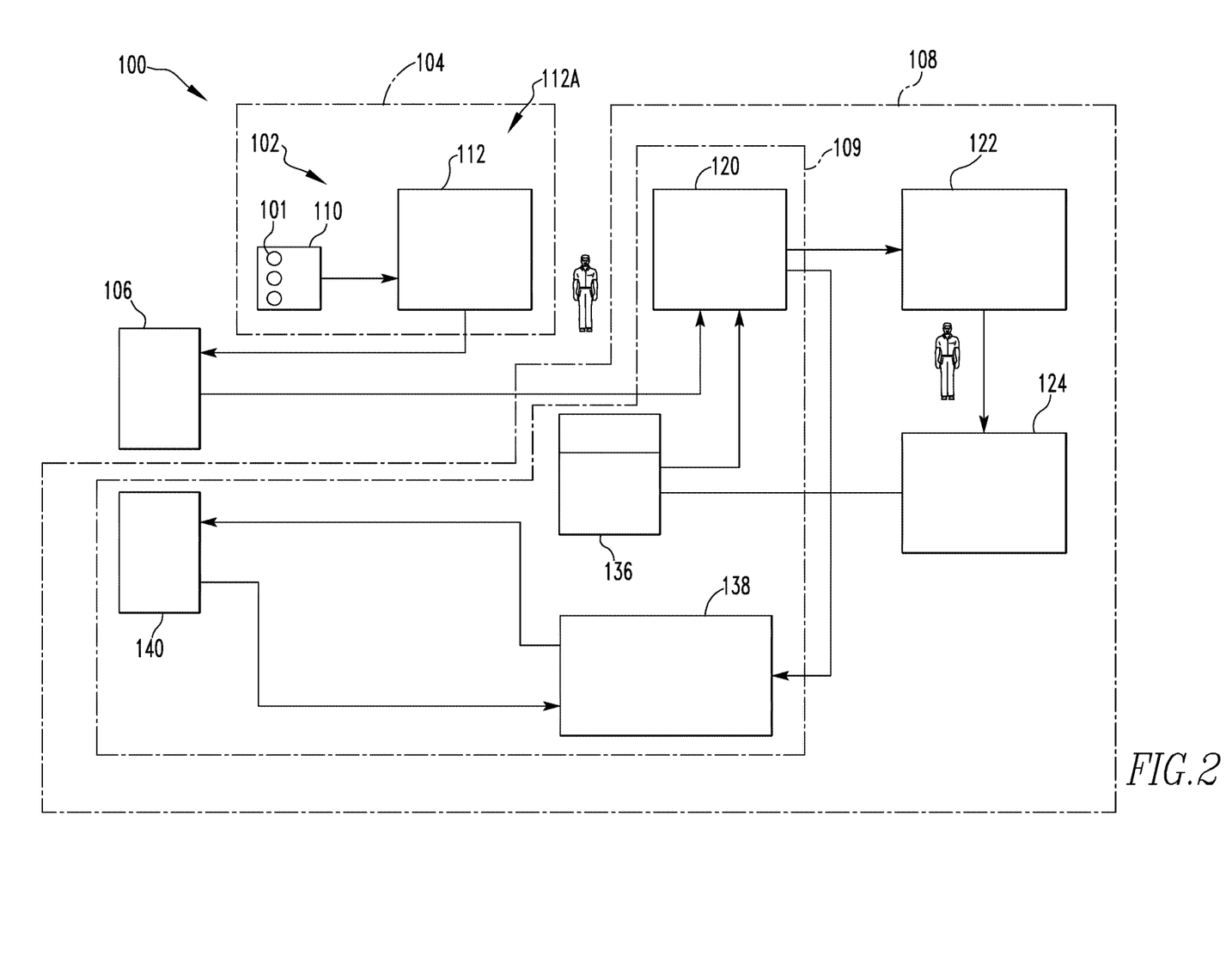
FIG. 2 is a schematic view of a score die forming system.

The score die 10 disclosed above is made in a score die forming system 100, as shown in FIG. 2. As used herein, a "system" means a plurality of associated machines, devices or similar constructs that are intended to be used, and are used, in a predetermined order to convert blanks, sheet metal or raw material into a plurality of a specific final product. Further, as used herein, individual machines, devices or similar constructs, or a collection of machines, devices or similar constructs that are not intended to be used, and are not used, in a predetermined order to convert a blank, sheet metal or raw material into a final product are not a "system" or a part of a "system." Further, as used herein, individual machines, devices or similar constructs cannot be included as part of a "system" because such constructs are not part of a plurality of associated machines. Thus, as used herein, a "score die forming" system is a plurality of associated machines, devices or similar constructs that are intended to be used, and are used, in a predetermined order to convert a blank, sheet metal or raw material into a score die 10, as described above.

The score die forming system 100 includes a number of plurality of forming assemblies 102. That is, the "plurality of forming assemblies" is identified by the collective reference number "102," individual forming assemblies, which are part of the "plurality of forming assemblies" 102 are identified below. The plurality of forming assemblies 102 are further divided into three types: soft forming assemblies 104, a heat treatment assembly 106, and hard forming assemblies 108. It is noted that associated machines/assemblies/constructs are included in these types of assemblies, 104, 106, 108. That is, as used herein, not all assemblies in, for example, the hard forming assemblies 108 are assemblies that form a blank or similar construct. Stated alternately, an assembly such as a coating assembly 140 that does not "form" or otherwise change the physical form of a blank is included with the "hard forming assemblies 108."

In an exemplary embodiment, the soft forming assemblies 104 include a blank providing assembly 110. As used herein, a "blank" means a piece of material prepared to be made into something (such as a score die) by a further operation. A "blank," including a partially formed "blank" is identified as a "blank" until the final operation. A blank providing assembly 110 is structured to either (1) cut die score blanks 101 from a stock material, or (2) feed preformed score die blanks 101 from a supply of score die blanks 101. As a score die 10 is generally cylindrical, the score die blanks 101 are also generally cylindrical disks. Further, similar reference numbers are used herein to identify similar constructs on the score die blank 101 even if those constructs are not in their final form.

The soft forming assemblies 104 further include an initial milling assembly 112 structured to initially form elements of the score die 10 including forming two unfinished dowel (or mounting) openings 20, 22 and an unfinished tear panel opening 24 as well as an unfinished score blade 18 on a score die blank 101. As such, the initial milling assembly 112 is also identified herein as an initial score blade forming assembly 112A that is structured to form an unfinished score blade 18. That is, the initial milling assembly 112 (or initial score blade forming assembly 112A) is structured to form a "generally finished" and/or a "soft finished" score blade 18.

The heat treatment assembly 106 is structured to apply heat of a sufficient temperature so as to harden the unfinished elements of the score die blank 101. That is, the heat treatment assembly 106 is structured to, as used herein, "heat treat" the score die blank 101. It is understood that, following treatment in the heat treatment assembly 106, the die blank becomes a "hard finished" score die blank 101 with a "hard finished" score blade 18 or, stated alternately, a heat treated generally finished score blade 18. Thus, the heat treatment assembly 106 is structured to, and does, heat treat a die blank 101 including a generally finished score blade 18. That is, as used herein, "structured to . . . heat treat a score die blank 101 including a generally finished score blade 18" means that the heat treatment assembly 106 is part of a score die forming "system" 100, as defined above, and that the heat treatment assembly 106 is located within the score die forming system 100 so that score die blanks 101 having a "soft finished" score blade 18 are provided thereto. Thus, as used herein, a heat treatment construct that is "capable" of being used to treat score die blanks 101 having a "soft finished" score blade 18, but which is not actually used to treat score die blanks 101 having a "soft finished" score blade 18, is not, "structured to . . . heat treat a score die blank 101 including a generally finished score blade 18."

The hard forming assemblies 108, in an exemplary embodiment, include a surface grinding assembly 120, a jig grinding assembly 122, a post-heat treatment machine forming assembly 124, a hand polishing station 136, an inspection station 138, and a coating assembly 140. The surface grinding assembly 120 is structured to, and does, remove heat treatment scale from the hard finished score die blank 101. The surface grinding assembly 120 is further structured to, and does, "parallel" the die body first surface 14 and the die body second surface 16 of the hard finished score die blank 101. As used herein, the verb "[to] parallel" means to make two generally planar surfaces substantially parallel. It is understood that constructs on such surfaces are excluded from being made parallel. That is, for example, on a score die blank 101, the die body first surface 14, excluding the score blade 18, is made substantially parallel to the die body second surface 16. The removal of the heat scale and paralleling the die body first surface 14 and the die body second surface 16 of the hard finished score die blank 101 are not, in an exemplary embodiment, performed at the same time.

The jig grinding assembly 122 is structured to, and does, finish the two dowel (or mounting) openings 20, 22 on the score die blank 101. The finished dowel openings 20, 22 are structured to precisely mount the score die blank 101. That is, the finished dowel openings 20, 22 are structured to mount the score die blank 101 with precise control of the orientation of the score die blank 101. The finished dowel openings 20, 22 are useful for precisely mounting the score die blank 101 in the post-heat treatment machine forming assembly 124.

The post-heat treatment machine forming assembly 124 is structured to form a machined smoothed surface. This solves the problem(s) noted above. In an exemplary embodiment, the post-heat treatment machine forming assembly 124 is structured to form a machined smoothed surface on the hard finished score blade 18. That is, the post-heat treatment machine forming assembly 124 is structured to, and does, perform forming operations on the hard finished score blade 18 which changes the shape of the hard finished score blade 18. Stated alternately, the post-heat treatment machine forming assembly 124 is structured to, and does, change any, or all, of the thickness, height and angle of the hard finished score blade 18. In an exemplary embodiment, the post-heat treatment machine forming assembly 124 is further structured to, and does, form a substantially finished score blade 18 on a score die blank 101. In an exemplary embodiment, the post-heat treatment machine forming assembly 124 is further structured to, and does, form the substantially finished score blade 18 with a number of cutting portions 26, 28. Further, the post-heat treatment machine forming assembly 124 is further structured to, and does, form each cutting portion 26, 28 with a substantially consistent cross-sectional shape. As used herein, a "consistent cross-sectional shape" means that thickness, height and angle of the hard finished score blade 18 are substantially similar along the length of each cutting portion 26, 28. That is, as used herein, "substantially similar along the length" means that any of the characteristics of thickness (at the flat vertex), height and/or angle of either cutting portion 26, 28 does not change by more than 10% along the length of the cutting portion 26, 28.

As before, and in an exemplary embodiment, the thickness (at the flat vertex) of the first cutting portion 26 does not vary more than 0.0002 inch along the length of the first cutting portion 26. Further, the angle of the first cutting portion 26 does not vary more than ¼ of a degree along the length of the first cutting portion 26. Further, in an exemplary embodiment, the height of first cutting portion 26 does not vary more than 0.0002 inch along the length of the first cutting portion 26. Similarly, the thickness (at the flat vertex) of the second cutting portion 28 does not vary more than 0.0002 inch along the length of the second cutting portion 28. Further, the angle of the second cutting portion 28 does not vary more than ¼ of a degree along the length of the second cutting portion 28. Further, in an exemplary embodiment, the height of second cutting portion 28 does not vary more than 0.0002 inch along the length of the second cutting portion 28.

Further, in an exemplary embodiment, the post-heat treatment machine forming assembly 124 is structured to, and does, form a score blade 18 with a surface having a smoothness of 8.0 RA (µm) or less.

Further, in an exemplary embodiment, the post-heat treatment machine forming assembly 124 is structured to, and does, form each cutting portion 26, 28 with an associated first surface 30 and second surface 32 that meet at the flat vertex 34. Further, the post-heat treatment machine forming assembly 124 is structured to, and does, form each cutting portion 26, 28 with a thickness of between substantially 0.001 inch and substantially 0.0015 inch and a vertex angle of substantially 25°.

Further, as noted above, the post-heat treatment machine forming assembly 124 is part of a "system" that is structured to form/create "a plurality of a specific final product." Thus, the post-heat treatment machine forming assembly 124 is structured to, and does, form a substantially finished score blade 18 and substantially uniform score blades 18 on a series of die blanks. As used herein, "structured to form a substantially finished score blade and substantially uniform score blade on a series of die blanks" means that a construct is structured to form/create more than one score die blank 101 wherein the score blades 18 on the plurality of score die blanks are "substantially finished," and, are "substantially uniform" relative to each other. Stated alternately, the post-heat treatment machine forming assembly 124 is structured to, and does, form score dies 10 with each score blade 18 having a substantially similar uniform cross-section. A post-heat treatment machine forming assembly 124 that forms a plurality of score die blanks 101 with a substantially uniform cross-section on a series of die blanks solves the problem(s) noted above. Stated alternately, a post-heat treatment machine forming assembly 124 that forms score dies 10 with each score blade 18 having a substantially similar uniform cross-section solves the problem(s) noted above.

The hard forming assemblies 108 that are used after the post-heat treatment machine forming assembly 124 are used in one exemplary embodiment and are collectively identified as the "finishing assemblies" 109. That is, in another embodiment, the finishing assemblies 109 are not used. The number of finishing assemblies 109 include the hand polishing station 136, the inspection station 138, and the coating assembly 140. The hand polishing station 136 is structured to be, and is, used after the post-heat treatment machine forming assembly 124. The hand polishing station 136 is used, if needed, to remove surface imperfections on the substantially finished score blade 18. That is, "light polishing" is performed at the hand polishing station 136.

The score die blank 101 is then returned to the surface grinding assembly 120 to "parallel" the die body first surface 14 and the die body second surface 16 as described above. At this point, providing the score die blank 101 and all sub-elements are within tolerances, forming operations are complete. Thus, the score die blank 101 is inspected at the inspection station 138. If the score die blank 101 passes the inspection criteria, i.e., if the score die blank 101 and all sub-elements are within tolerances, the score die blank 101 has a coating 50 applied to the score blade 18 at the coating assembly 140. In an exemplary embodiment, the coating assembly 140 is structured to, and does, apply a thin coating 50 or a very thin coating 50 to the score blade 18. This solves the problem(s) noted above. Following the application of the coating the score die 10 is finished, i.e., it is no longer a score die blank 101. In an exemplary embodiment, the score die 10 is inspected at the inspection station 138 again.

Figure 3:
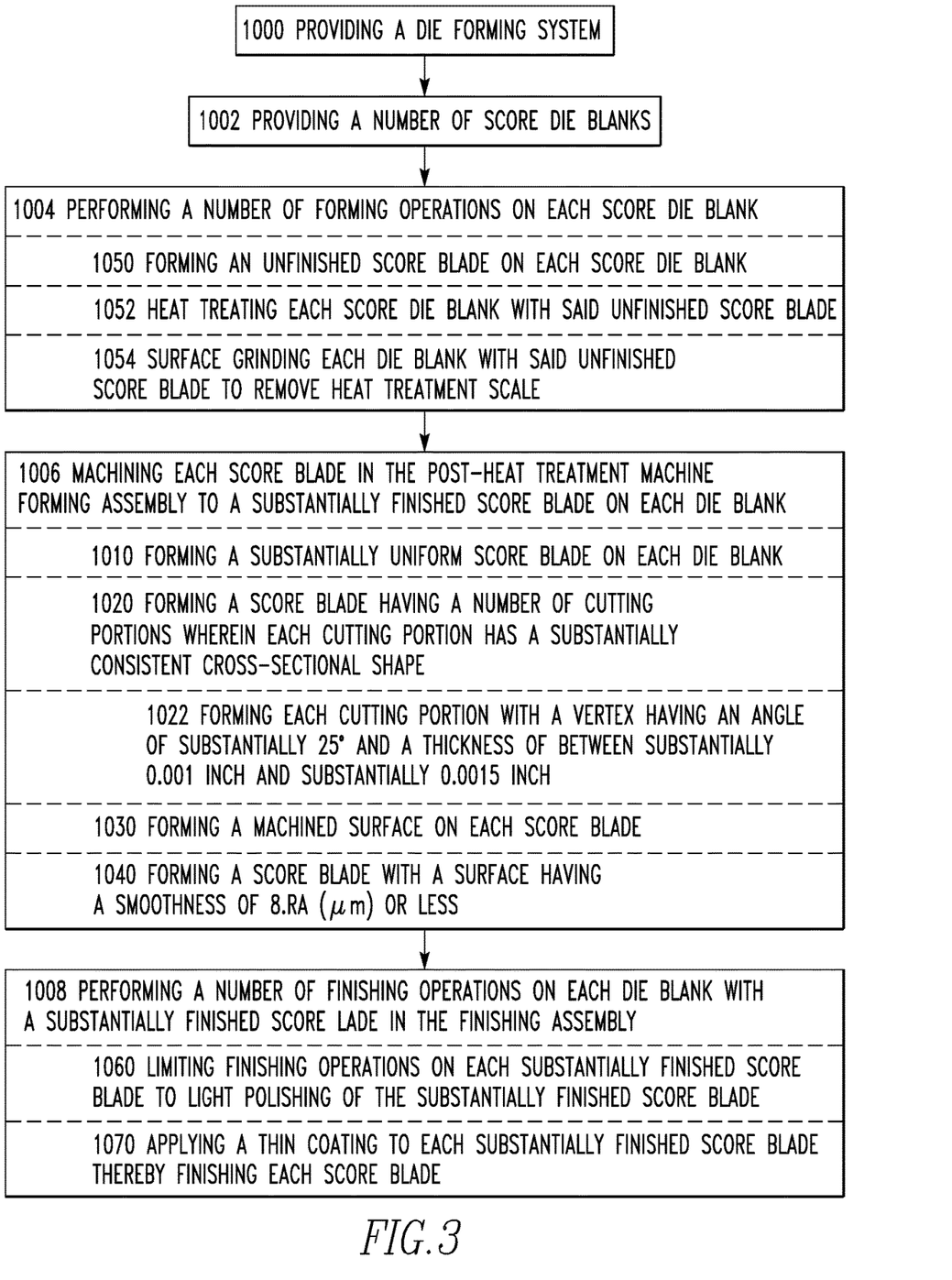
FIG. 3 is a flow chart of the method.

As shown in FIG. 3, a method of forming the score die 10 described above includes, in an exemplary embodiment, the following. Providing 1000 a die forming system 100 including a plurality of forming assemblies 102 including a heat treatment assembly 106, a post-heat treatment machine forming assembly 124 structured to form a machined smoothed surface, and a number of finishing assemblies 109, providing 1002 a number of score die blanks 101, performing 1004 a number of forming operations on each score die blank 101 in said plurality of forming assemblies 102 to form a heat treated generally finished score blade 18 on each score die blank 101, machining 1006 each score blade 18 in the post-heat treatment machine forming assembly 124 to form a substantially finished score blade 18 on each die blank 10, performing 1008 a number of finishing operations on each die blank with a substantially finished score blade 18 in the finishing assemblies 109.

In an exemplary embodiment, machining 1006 each score blade 18 in the post-heat treatment machine forming assembly 124 to form a substantially finished score blade 18 on each die blank 10 includes forming 1010 a substantially uniform score blade on each die blank.

In an exemplary embodiment, machining 1006 each score blade 18 in the post-heat treatment machine forming assembly 124 to form a substantially finished score blade 18 on each die blank 10 includes forming 1020 a score blade having a number of cutting portions wherein each cutting portion has a substantially consistent cross-sectional shape. Further, in an exemplary embodiment, forming 1020 a score blade having a number of cutting portions wherein each cutting portion has a substantially consistent cross-sectional shape includes forming 1022 each cutting portion with a vertex having an angle of substantially 25° and a thickness of between substantially 0.001 inch and substantially 0.0015 inch.

In an exemplary embodiment, machining 1006 each score blade 18 in the post-heat treatment machine forming assembly 124 to form a substantially finished score blade 18 on each die blank 10 includes forming 1030 a machined smoothed surface on each score blade 18.

In an exemplary embodiment, machining 1006 each score blade 18 in the post-heat treatment machine forming assembly 124 to form a substantially finished score blade 18 on each die blank 10 includes forming 1040 a score blade 18 with a surface having a smoothness of 8.0 RA (μm) or less.

In an exemplary embodiment, performing 1004 a number of forming operations on each score die blank 101 in said plurality of forming assemblies 102 to form a heat treated generally finished score blade 18 on each score die blank 101 includes forming 1050 an unfinished score blade 18 on each score die blank 101, heat treating 1052 each score die blank with said unfinished score blade, and surface grinding 1054 each die blank with said unfinished score blade to remove heat treatment scale.

In an exemplary embodiment, performing 1008 a number of finishing operations on each die blank with a substantially finished score blade 18 in the finishing assemblies 109 includes limiting 1060 finishing operations on each substantially finished score blade 18 to light polishing of the substantially finished score blade 18, and, applying 1070 a thin coating to each substantially finished score blade thereby finishing each score blade 18. As used herein, "limiting finishing operations on each substantially finished score blade 18 to light polishing of the substantially finished score blade" means that no forming operations, i.e., operations that change the characteristics of the score blade 18, occur. As used herein, "light polishing" does not change the characteristics of the score blade 18.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A method of forming a score die comprising:
    providing a number of blanks;
    forming a soft finished score blade on each blank;
    heat treating each soft finished score blade to change each soft finished score blade into a hard finished score blade on each blank;
    machining each said hard finished score blade to change a shape of each hard finished score blade into a substantially finished score blade on each blank; and
    performing a number of finishing operations on each said blank with said substantially finished score blade,
    wherein each substantially finished score blade includes a number of cutting portions,
    wherein each cutting portion includes a first surface, a second surface, and a flat vertex,
    wherein the flat vertex extends from the first surface to the second surface,
    wherein a thickness of each cutting portion at the flat vertex does not change by more than 10% along a length of the cutting portion,
    wherein a height of each cutting portion does not change by more than 10% along the length of the cutting portion,
    wherein an angle between the first surface and the second surface of each cutting portion does not change by more than 10% along the length of the cutting portion, and
    wherein the angle between the first surface and the second surface is substantially 25°, and wherein the flat vertex has a length of between 0.001 inch and 0.0015 inch.

2. The method of claim 1 wherein the substantially finished score blades are substantially uniform relative to each other.

3. The method of claim 1 wherein each substantially finished score blade includes a machine smoothed surface.

4. The method of claim 3 wherein said finishing operations include applying a thin coating to each said substantially finished score blade.

5. The method of claim 4, wherein the thin coating has a thickness of less than 0.00008 inch.

6. The method of claim 4, wherein the thin coating is a very thin coating having a thickness of less than 0.00004 inch.

7. The method of claim 1 wherein each substantially finished score blade includes a surface having a smoothness of 8.0 Ra($\mu$m) or less.

8. The method of claim 1 wherein said finishing operations include no more than light polishing of said substantially finished score blade and applying a thin coating to each said substantially finished score blade.

9. The method of claim 1, wherein the thickness of each cutting portion at the flat vertex does not change by more than 0.00002 inch along the length of the cutting portion.

10. The method of claim 1, wherein the height of each cutting portion does not change by more than 0.0002 inch along the length of the cutting portion.

11. The method of claim 1, wherein the angle between the first surface and the second surface of each cutting portion does not change by more than 0.25 degree along the length of the cutting portion.

* * * * *